Oct. 1, 1940.　　　W. A. GIBBS　　　2,216,665
ANIMAL TRAP
Filed Nov. 10, 1939
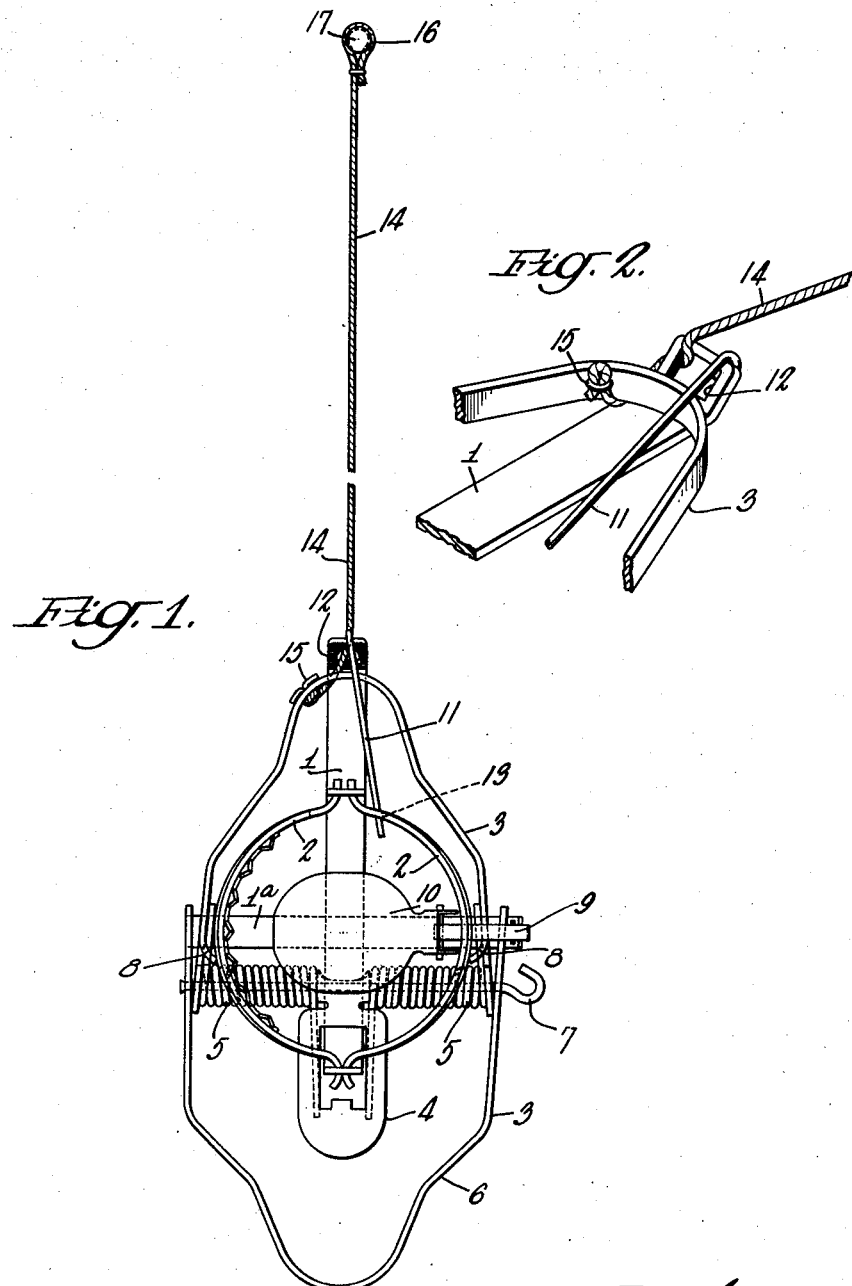

Patented Oct. 1, 1940

2,216,665

UNITED STATES PATENT OFFICE 2,216,665

ANIMAL TRAP

Walter A. Gibbs, Holly Oak, Del.

Application November 10, 1939, Serial No. 303,887

5 Claims. (Cl. 43—90)

This invention relates to animal traps of the type employing a plurality of sets of jaws and more particularly to traps of the multiple jaw type having a common releasing means for the respective sets of jaws.

Traps of this nature usually embody a primary or leg gripping set of jaws, and secondary or body engaging means, which may be another set of jaws, a single jaw, a guard or other device, which by contact with the body of an animal, is intended to assist the primary gripping means to retain the animal gripped by it, and it is customary to construct and arrange these traps so that the primary jaws close upon the leg of the animal to be caught, before the secondary means engages or contacts the body of the animal, since otherwise the foot, or other part of the animal which contacts the mechanism to release the jaws may be thrown clear of said primary jaws by the secondary means before the former have approached sufficiently close together to take hold.

Irrespective of this delayed closing of the secondary means of such traps, these secondary or body engaging means when actuated by springs of sufficient strength to be effective, still have a tendency to knock an animal out of or away from the leg gripping jaws, thus causing the escape of the animal, or preventing its getting caught at all.

With the foregoing in mind the object of the present invention is to provide an animal trap of the character described embodying novel construction operative to retard or slow-up the action of the secondary body-engaging means by restraining them against their spring action and by so controlling them as to reduce the violence of their unrestricted action.

This and other objects of the invention and the features and details of the construction and operation thereof are hereinafter fully set forth and shown in the accompanying drawing, in which:

Figure 1 is a view in plan of a set trap embodying the present invention; and

Figure 2 is a fragmentary view in perspective of one modified form of the invention.

Referring now to the drawing, animal traps of the type here involved may, for example, in one form comprise a base consisting of crossed members 1 and 1a upon which are mounted at right angles the sets of primary jaws 2, 2, and secondary jaws 3, 3. In the form of trap shown, the primary jaws 2, 2, which are both movable, are actuated through a lever 4 of well known form by coiled springs 5, 5, suitably supported on the frame.

Of the secondary jaws 3, 3, the one designated by the reference numeral 6 is fixed to the frame and is not movable with respect thereto, the other of the jaws 3 being pivotally mounted upon a cross rod 7 whose extremities are secured in the opposite sides of the said jaw 6, and which also constitutes a support for the coiled springs 5, 5. The latter in addition to actuating the lever 4 and the primary jaws 2, 2, also are employed to actuate the movable jaw of the secondary set through lugs 8, 8 on the said movable secondary jaw.

The primary jaws are maintained in the open or set position shown by means of a latch 9 pivotally connected to the base member 1a, which latch has its end inserted beneath the edge of a treadle 10 so that until the said treadle is depressed, the said jaws 2, 2 are maintained in open position.

The movable secondary jaw is maintained in open or set position by means of another latch element 11 which is pivotally secured through an opening 12 in the base member 1 and then passes over said movable secondary jaw with its free end portion engaged beneath one of the set primary jaws 2, 2.

In the particular form of trap illustrated in the drawing, delayed actuation or release of the movable secondary jaw is effected by providing a notch or shoulder 13 in the underside of the jaw 2 for engagement by the latch 11 so that said latch is not freed to permit closing of said jaw 3 until the jaws 2, 2 are substantially closed.

This delayed closing of the secondary jaws 3, 3 is intended to operate to insure gripping of the animal in the primary jaws 2, 2, before its body is engaged or gripped by said secondary jaws, thus reducing the tendency of the secondary jaws to knock the animal out of or away from said primary jaws.

As previously stated, I have found that irrespective of such delayed closing of the secondary jaws 3, 3, the unrestricted action of said jaws, when actuated by springs of sufficient strength to be effective, still has a tendency to permit the escape of too large a percentage of animals. The particular feature of the invention, therefore, resides in the discovery that if I retard or slow up and reduce the violence of the unrestricted action of these secondary jaws, the percentage number of animals permitted or caused to escape is greatly reduced.

According to the invention, this slowing-up and reduction in the violence of the unrestricted action of the secondary jaws 3, 3 is in the present instance accomplished by a frictional or snubbing force operating in opposition to the jaw actuating springs 5, 5, and set up or effected by a friction element such as a cord, rope or the like 14.

In the particular form of the invention shown in the drawing this friction element or rope 14 passes through the aforesaid opening 12 in the base member 1 and has its inner end connected or attached to the movable secondary jaw 3 as indicated at 15 at a point adjacent but laterally of the said opening 12 when said jaw 3 is in open or set position. This friction element 14 may pass directly through the opening 12 as shown in Figure 1, although materially more effective results are obtained by passing said element 14 reversely through said opening 12 as shown in Figure 2.

Traps of this type are, of course, usually secured to or by a stake imbedded in the ground to prevent an animal from dragging the trap away after being caught, and to this end the friction element or rope 14 preferably has its other or outer end provided with a loop 16 to receive or embrace a securing stake 17.

Thus it will be seen that by passing the friction element or rope 14 through the opening 12 and securing the inner end of said rope to the movable secondary jaw at a point laterally offset from said opening, when the movable secondary jaw 3 is released and starts to close under the action of springs 5, 5, the said jaw 3 will tend to draw the friction element or rope 14 through the opening 12 and in rubbing contact with the walls of said opening 12 thus producing a snubbing or retarding action in opposition to the force of said springs 5, 5 upon the said jaw 3.

In addition to this snubbing action produced by contact of the rope 14 with the wall of the opening 12 withdrawal of said rope through said opening is resisted because the other end thereof is secured to the fixed stake 17. Thus in order for the movable jaw 3 to close it is necessary that the trap itself creep along the rope to or toward the said stake 17.

This creeping of the trap along the friction element or rope 14 to or toward the stake 17 consumes a fair proportion of the force of the actuating springs 5, 5 which, added to that portion of their force dissipated in overcoming the snubbing action of the friction element or rope 14, is sufficient to retard or slow-up and reduce the violence of the closing action of the secondary jaws to an extent that the tendency for said jaws 3, 3 to knock an animal out of or away from the primary jaws 2, 2, causing its escape or preventing its being caught at all, is substantially eliminated.

The present invention affords a highly novel, quite simple yet extremely effective solution to the long existing problem of eliminating the tendency in traps of the present type of the secondary jaws knocking the animal out of or away from the leg gripping jaws thus permitting its escape or preventing its being caught at all.

The retarding element may, of course, be embodied in animal traps in a variety of forms and arrangements, and while a certain embodiment of the invention has been illustrated and described herein, it is not intended to limit said invention to such disclosure but that changes and modifications in the form and arrangement of the invention may be made within the scope of the annexed claims.

I claim:

1. In an animal trap of the type described, the combination with leg gripping and body contacting means and means for actuating the same into closed gripping relation, of means operable upon release of the body contacting means to dissipate a part of the force of the actuating means upon said body contacting means and retard and reduce the violence of the closing thereof.

2. In an animal trap of the type described, the combination with primary and secondary pairs of jaws, of a friction element connected to one of the secondary jaws arranged for snubbing engagement with another part of the trap upon release and actuation of said secondary jaws to retard closing of the same.

3. In an animal trap, the combination of a supporting frame, primary and secondary gripping elements mounted on the frame, at least one spring for actuating the gripping elements, animal releasable means for retaining the gripping elements in open position, and means operable to dissipate a part of the force of said spring upon the secondary gripping elements when released to retard and reduce the violence of the closing thereof.

4. An animal trap having jaws constituting primary gripping means, and secondary body contacting means adapted to contact with an animal held by the primary means and to force said animal out of a normal position with respect to said primary means, and means for controlling and retarding closing movement of said secondary body contacting means to prevent the same from contacting the animal with sufficient speed and impact to throw the said animal clear of the primary means before becoming securely gripped therein.

5. In an animal trap of the type described, the combination with movable primary leg gripping means and movable secondary body engaging means, of means for attaching the trap to a fixed element in the ground, said means being connected to said secondary body engaging means and having a portion thereof arranged for snubbing engagement with another portion of the trap upon release of the body engaging means to retard and reduce the violence of the closing action thereof.

WALTER A. GIBBS.